Dec. 30, 1969 L. L. ROBERSON 3,486,709

REEL

Filed Jan. 12, 1968

INVENTOR.
LESLIE L. ROBERSON
BY Robert Berliner
ATTORNEY.

United States Patent Office 3,486,709
Patented Dec. 30, 1969

3,486,709

REEL

Leslie L. Roberson, Los Angeles, Calif., assignor to Bell & Howell Company, Chicago, Ill., a corporation of Illinois Filed Jan. 12, 1968, Ser. No. 697,469
Int. Cl. B65h *75/18*
U.S. Cl. 242—71.8 2 Claims

ABSTRACT OF THE DISCLOSURE

A self-seating reel having a center hole and slots radiating therefrom, constructed to facilitate engagement with one or more lugs radiating from a spindle by beveling the hub portion adjacent the slots to present lead-in edges to said lug.

BACKGROUND OF THE INVENTION

Field of the invention

The field of art to which the invention pertains includes the field of winding and reeling, particularly the subfield of supporters and holders.

Description of the prior art

Major innovations have been made in recent years in the field of tape and film handling. Improved designs have been developed for magnetic tape cartridges, automatic tape loading mechanisms and self-loading tape reels and decks. These designs have not only facilitated the use of magnetic tape in standard recorders but have enabled its use in more compact environments, e.g. in the automobile, and in portable recorders.

Cartridges and automatic loading mechanisms have also been developed for motion picture reeling. For example, the use of cartridges for the Super-8 film format and for airline film entertainment have made easy-load mechanisms desirable for both camera and projector.

In all of the foregoing devices, a mechanism for rapidly and reliably loading a film or tape reel is very desirable. Prior mechanisms to facilitate reel loading have generally relied on the use of accessories and costly centering hubs, or have required special spindle designs.

SUMMARY OF THE INVENTION

The present invention provides an inexpensive, self-seating reel that can be rapidly and reliably loaded on a tape deck, projector or camera spindle. The reel can be constructed of molded plastic. It requires no accessory hubs and is compatible with standard spindle designs that have a center post and one or more, typically three, driving lugs. The hub portion of the reel has a center hole for receiving the spindle and at least one slot associated with the center hole for engaging the lug. To make the reel self-seating, the hub portion is beveled adjacent at least one side of each slot to widen the slot thereat to thereby facilitate engagement with the spindle lug.

In particular embodiments, a plurality of slots are provided with beveled edges arranged to provide a non-planar hub surface in the vicinity of the center hole. The slots can be beveled along each side with the beveled portions meeting to provide lead-in edges to each slot. To ensure engagement on the appropriate reel side, the number of slots extending through the hub portion from one side of the reel to the other side thereof may be less than the number of lugs associated with the spindle.

DESCRIPTION OF THE PREFERRED EMBODIMENTS

Figures 1, 2, 3:
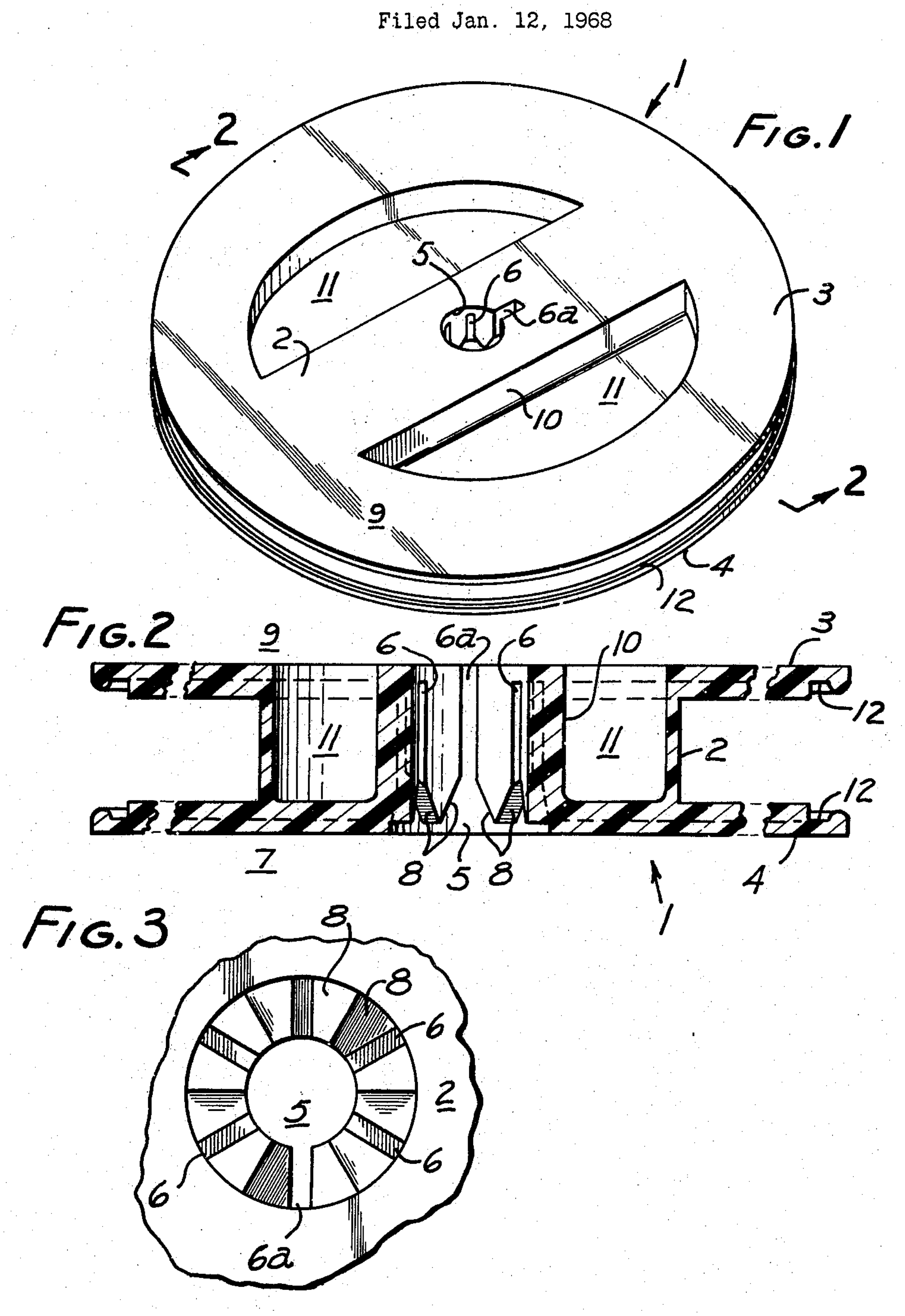
FIGURE 1 is a perspective, generally top view of a reel of this invention.
FIGURE 2 is a cross-sectional side view taken on line 2—2 of FIGURE 1.
FIGURE 3 is a bottom elevational view of the hub portion of the reel.

Referring to FIGURES 1, 2 and 3, a reel 1 is shown, molded of plastic, and comprising a hub portion 2 flanked by two disk-like flanges 3 and 4. The hub portion 2 has a centrally located hole 5 therethrough. Six slots 6, equidistant on the bottom side 7 of the reel 1, radiate from the center hole 5. The center hole 5 and slots 6 are dimensioned to receive a standard spindle having from one to three driving lugs.

Each of the slots 6 is provided with a beveled lead-in portion or chamfer 8 obtained by beveling the hub 2 at slot edges at a 30° angle until the beveled portions 8 meet. A substantially non-planar hub surface is thereby provided in the vicinity of the center hole 5. Other lead-in angles can be used, the particular angle depending on the number of slots 6 and depth of chamfer 8 allowable. Generally, a sufficient amount of unbeveled slot should remain to enable a working engagement with the lug of a spindle.

One of the slots **6*a* can extend through the hub from the bottom side 7 of the reel 1 to the top side 9 thereof. The remaining slots do not extend through the top side 9, thus ensuring engagement on the appropriate reel side. This design arrangement allows the reel to be utilized to accommodate the driving pin of a magnetic tape duplicator, as known to the art. With motion picture film, such a design allows a different spindle to be used where a reverse orientation is required, for example when exposing on both edges of 16 mm. film utilizing a regular 8 mm. format. In this latter case, if both spindles have the same plural number of lugs, simple modification to remove one lug from one spindle will allow the reel to be permanently oriented. In appropriate situations, the edges of the slot or slots on the top side 9** may also be beveled as above.

In use, when a reel of this invention is placed on an appropriate spindle, if the driving lugs do not line up with the slots 6, they contact the lead-in chambers 8. A slight axial pressure, merely the weight of the reel if horizontal, causes the spindle to rotate until the lugs line up with the slots 6, they contact the lead-in chamfers 8. A slight dle.

The foregoing self-seating design accentuates the usefulness of other automatic and easy-load reel design features. For example, a reel handle 10, formed by depressions 11 in hub 2, facilitates rapid handling of the reel 1. Grooves 12 along the rims of flanges 3 and 4 serve to retain a stiff tape leader, as well known in the art. Other automatic features can be used and modifications of the reel hub design can be made without departing from the spirit of the invention.

I claim:

1. A self-seating reel engageable with a spindle having at least one lug radiating therefrom, comprising a hub portion having equally spaced slots radiating from a center hole therein and being beveled on both sides of each slot, the beveled portions of each slot meeting the beveled portions of its neighboring slot to provide lead-in edges to each slot to thereby facilitate engagement with said lug, at least one of said slots but less than a total number of said slots extending through the hub portion from one side of the reel to the other side thereof.

2. A reel comprising a hub portion having a plurality of slots on at least one side of the reel radiating from a center hole therein and being beveled adjacent at least one side of said slots to provide substantial non-planarity thereat, at least one of said slots but less than a total number of said slots extending through the hub portion from one side of the reel to the other side thereof.

References Cited

UNITED STATES PATENTS

| | | | |
|---|---|---|---|
| 1,407,445 | 2/1922 | Spangler | 64—9 |
| 1,864,090 | 6/1932 | Muller | 64—9 |
| 2,803,413 | 8/1957 | Lyon | 242—68.3 |
| 3,064,917 | 11/1962 | Roberts et al. | |
| 3,315,909 | 4/1967 | Gerfast | 242—68.3 |

NATHAN L. MINTZ, Primary Examiner